United States Patent [19]

Haenle

[11] 3,894,608
[45] July 15, 1975

[54] LIGHTNING PROTECTION DEVICE FOR AUTOMOBILES

[75] Inventor: Karl W. Haenle, Munich, Germany

[73] Assignee: Messerschmitt-Bolkow-Blohm GmbH, Munich, Germany

[22] Filed: July 1, 1968

[21] Appl. No.: 741,742

[30] Foreign Application Priority Data

July 21, 1967 Germany.............................. 34443

[52] U.S. Cl. ....................... 180/82; 317/2; 296/31
[51] Int. Cl. ............................................. B60r 18/06
[58] Field of Search ......... 180/82; 244/1; 317/2, 10; 296/31; 315/36

[56] References Cited
UNITED STATES PATENTS

| | | | |
|---|---|---|---|
| 1,419,261 | 6/1922 | Howard | 317/2 |
| 1,553,087 | 9/1925 | Lehmann | 317/2 X |
| 1,744,004 | 1/1930 | Hunt | 317/2 |
| 2,293,918 | 8/1942 | Planiol | 317/2 |
| 2,318,340 | 5/1943 | Thacher et al. | 317/2 |
| 2,858,482 | 10/1958 | Nutter | 317/2 |
| 2,982,494 | 5/1961 | Amason | 244/1 |
| 3,068,043 | 12/1962 | Komenda | 296/31 |
| 3,331,627 | 7/1967 | Schroder | 296/31 |
| 3,416,027 | 12/1968 | Amason et al. | 244/1 |

*Primary Examiner*—Kenneth H. Betts

[57] ABSTRACT

A lightning protection device for automobiles having non-metallic body components. A conductive element is applied to the various non-metallic body sections. The ends of the conductive element are connected to metallic fasteners in the form of bushings or threaded inserts. A threaded fastener is passed through the bushing and screwed into the threaded insert, thereby securing the body sections together and providing an electrically conductive path between the conductive elements of the various non-metallic components. In this manner, a continuous, electrically conductive path throughout the non-metallic portions of the automobile is provided.

4 Claims, 6 Drawing Figures

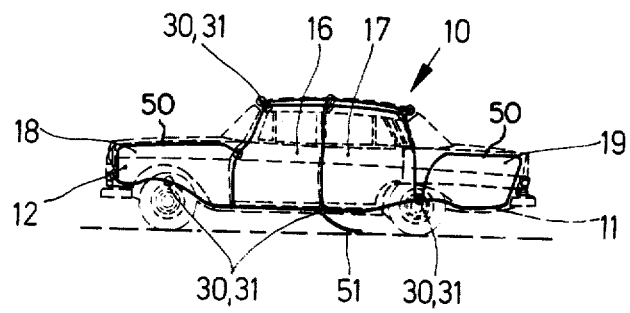
FIG. 1
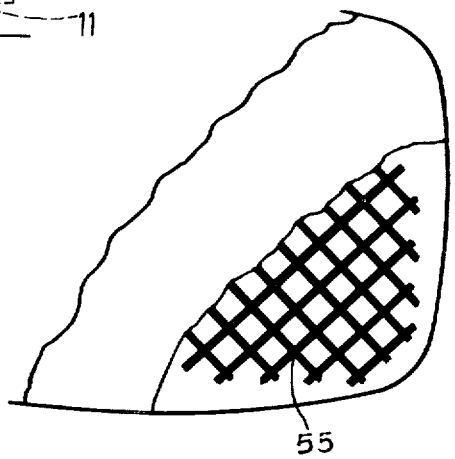
FIG. 6
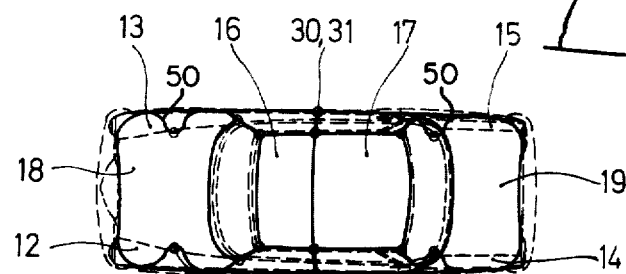
FIG. 2
FIG. 3   FIG. 4
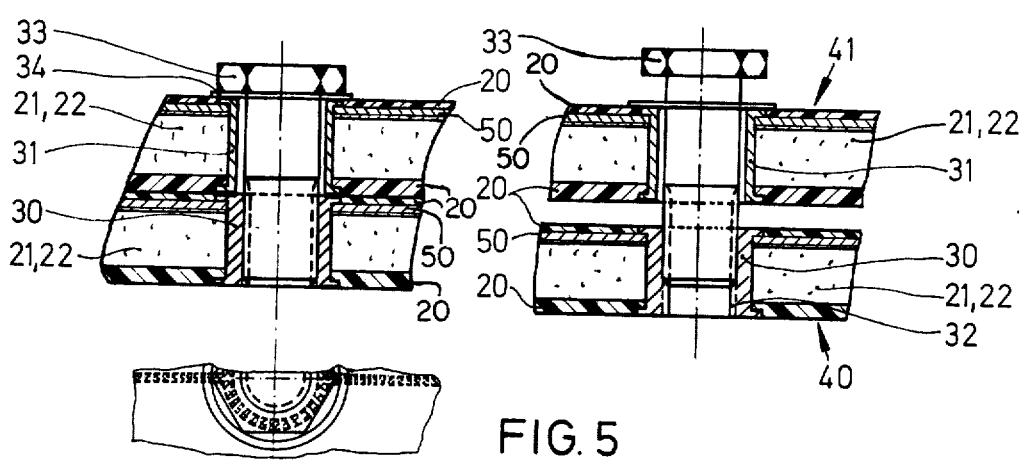
FIG. 5

LIGHTNING PROTECTION DEVICE FOR AUTOMOBILES

BACKGROUND OF THE INVENTION

This invention relates to a lightning protection device for automobiles having non-metallic bodies.

Various types of non-metallic body constructions are presently being used in the manufacture of automobiles. Lightweight materials, such as fiberglassreinforced plastics are being used increasingly as they provide automobile constructions which are quiet and corrosion resistant. Further, such constructions have improved plasticity in the event of collision, as well as low structural weight which provides a corresponding increase in passenger and cargo capacity.

However, the use of such non-metallic substances for the manufacture of a substantial part of the automobile body increases the danger of exposure of the occupants to lightning. It is an object of the present invention to provide lightning protection to the occupants of automobiles having bodies substantially constructed of non-metallic materials. The illustrated embodiment achieves this object by electric conductors which are mounted or imbedded within the non-metallic body components. The conductors of each of the components are connected electrically at their common fastening points.

Thus, a metallic cage is provided which protects the occupants of the vehicle from lightning and additionally provides a discharge path for any electrostatic charges which may be created during operation of the vehicle.

Other features of the invention will become apparent through reference to the following description and accompanying drawing which show an illustrative embodiment of this invention.

BRIEF DESCRIPTION OF THE DRAWING

FIG. 1 is a perspective side view of an automobile including certain features of this invention.

FIG. 2 is a top view of the automobile illustrated in FIG. 1.

FIG. 3 is a sectional view of a fastening device forming a component of the automobile illustrated in FIG. 1.

FIG. 4 is a sectional view of the fastening device of FIG. 3 prior to securement thereof.

FIG. 5 is a fragmentary, top view of the fastening device illustrated in FIG. 3.

FIG. 6 is a fragmentary top view showing a modified form of conductor arrangement.

DESCRIPTION OF THE PREFERRED EMBODIMENT

Referring to FIGS. 1 and 2, an automobile is generally indicated by the numeral 10. The body of the automobile 10 is indicated by dotted lines and is constructed primarily of plastic materials. The body includes the chassis 11; mudguards 12, 13, 14 and 15; side panels 16 and 17; hood 18; and trunk door 19 which are constructed of adjacently disposed plastic layers 20 which define hollow spaces 21 filled with a material such as a thermo-setting resin. The solid lines 50 in FIGS. 1 and 2 indicate electrical conductors and are embedded in the automobile body as will be more fully explained below.

To attach the engine, chassis and other parts to the plastic body and to interconnect the various body sections, threaded insert fittings are embedded in the plastic parts.

With particular reference to FIGS. 3, 4, and 5, the metal fitting 30 is inserted in a plastic panel 40 which is provided with an internal thread 32 receiving a threaded cap screw 33. The cap screw 33 serves to attach a second plastic component 41 to the automobile body 10. For this purpose, the component 41 is fitted with a metal bushing 31 defining a cylindrical opening for receiving the cap screw 33.

The inserts or fittings are connected to a metallic conductor 50. The conductor 50 is embedded in the walls 20 and 21 which, as previously mentioned, are constructed of fiberglass-reinforced plastic. Each of the conductors terminates at a metallic insert or bushing. The component parts are fastened together by the cap screws 33 and pins 34. In this manner, a continuous conductive path is produced between the assembled plastic parts. Since the upper, lower, and side body sections of the automobile 10 are provided with such conductive paths, a form of Faraday cage is produced which provides lightning protection for automobile bodies made substantially of nonconductive material.

The conductive elements may consist of copper mesh or, alternatively, of layers of graphite or other suitable metal powder. The conductive elements may be applied during manufacture to the formed component parts or, alternatively, incorporated into the components during molding. It is preferable that the electrical conductors be embedded in the outer layer of the plastic body components. Alternatively, the various plastic components may also be rendered electrically conductive by means of electroplating a metallic coating 55 thereon. The deposited metalic coating can be in strip form and extend across the panels in the manner of a conductor 50 or it can extend substantially over the entire area of each panel. In each case, each deposited conductor coating is in electrical communication with fastener components 30 or 31, and thereby with each other and the metallic automobile frame. FIG. 6 shows an electro-deposited conductor layer in a mesh pattern. This pattern can be effected by many known processes whereby deposit-resist coatings are applied in a selected pattern. In the event the electrical conductors are embedded in the automobile body sections, they are also terminated in connectors so that an electrical path is provided between the various sections.

The diversion of static electricity to ground is effected through the chassis parts which are secured to inserts or fittings or by trailing upon the ground a strap 51 which is attached to the chassis or to the inserts.

Although only one specific embodiment of the invention has been herein shown and described, it should be understood that certain details of the construction shown may be altered without departing from the spirit and scope of this invention as defined by the following claims.

I claim:

1. A lightning protection apparatus for automobiles having a metallic frame, a non-metallic body attached to said frame, said body comprising a plurality of panels, metallic means connecting said panels to each other and to said metallic frame, at least one electrical conductive element extending through each of said panels said conductive elements in said panels being in electrical communication with each other and with said metallic frame through said connecting means to form a conductive cage about said body.

2. An apparatus in accordance with claim 1 wherein said electrical conductor is in the form of a copper screen.

3. An apparatus in accordance with claim 1 wherein the electric conductor is in the form of a powdered metallic layer.

4. An apparatus in accordance with claim 1 wherein said conductor is in the form of a metallic coating electroplated upon the surface of said non-metallic components.

* * * * *